(12) United States Patent
Zetterman et al.

(10) Patent No.: US 8,612,595 B2
(45) Date of Patent: Dec. 17, 2013

(54) WIRELESS RESOURCE SHARING FRAMEWORK

(75) Inventors: Tommi Zetterman, Espoo (FI); Kalle Raiskila, Nukari (FI)

(73) Assignee: Nokia Corporation, Espoo (FI)

( * ) Notice: Subject to any disclaimer, the term of this patent is extended or adjusted under 35 U.S.C. 154(b) by 709 days.

(21) Appl. No.: 12/573,363

(22) Filed: Oct. 5, 2009

(65) Prior Publication Data
US 2011/0082935 A1 Apr. 7, 2011

(51) Int. Cl.
*G06F 15/16* (2006.01)

(52) U.S. Cl.
USPC .......................................... 709/226

(58) Field of Classification Search
USPC ......... 709/226, 223–225, 203–205, 217, 218; 718/100, 102–104, 107
See application file for complete search history.

(56) References Cited

U.S. PATENT DOCUMENTS

| | | | | |
|---|---|---|---|---|
| 6,990,087 | B2 * | 1/2006 | Rao et al. | 370/330 |
| 7,707,248 | B2 * | 4/2010 | Simard et al. | 709/204 |
| 7,756,489 | B2 * | 7/2010 | Ishikawa et al. | 455/84 |
| 7,949,364 | B2 * | 5/2011 | Kasslin et al. | 455/552.1 |
| 2006/0282497 | A1 * | 12/2006 | Braun et al. | 709/203 |
| 2008/0313642 | A1 * | 12/2008 | Karaoguz et al. | 718/104 |
| 2009/0291701 | A1 | 11/2009 | Zetterman et al. | |
| 2009/0298522 | A1 * | 12/2009 | Chaudhri et al. | 455/509 |
| 2010/0115575 | A1 * | 5/2010 | Yu et al. | 725/142 |

OTHER PUBLICATIONS

Newman et al., "A Software Defined Radio Architecture Model to Develop Radio Modem Component Classifications," Dec. 5, 2005, New Frontiers in Dynamic Spectrum Access Networks, 2005. DySPAN 2005. 2005 First IEEE International Symposium on, ieeexplore.ieee.org/stamp/stamp.jsp?tp=&arnumber=1542674.*
Ari Ahtiainen, et al.; Multiradio Scheduling and Resource Sharing on a Software Defined Radio Computing Platform; Proceedings of the SDR '08 Technical Conference and product Exposition, Copyright (c) 2008 SDR Forum, Inc.

* cited by examiner

*Primary Examiner* — Ruolei Zong
(74) *Attorney, Agent, or Firm* — Locke Lord LLP (57) ABSTRACT

A system for making resources in an apparatus available to an entity outside of the apparatus. In at least one example operational scenario, an apparatus may wirelessly interact with other apparatuses via various communication protocols. These apparatuses may be part of an architecture that allows resources to be shared within the architecture. An "entity" may further exist in the architecture that controls how resources are borrowed from, or how resources are provided to, the individual participating apparatuses. Access to apparatus resources may be provided through reallocation of reconfigurable components to a control element within the apparatus, the control element corresponding to the entity existing outside of the apparatus.

19 Claims, 10 Drawing Sheets

WIRELESS RESOURCE SHARING FRAMEWORK

BACKGROUND

1. Field of Invention

The present invention relates to wireless communication in an apparatus, and in particular, to utilizing reconfigurable communication resources residing in an apparatus for making resources in the apparatus available to resource sharing entities outside of the apparatus.

2. Background

Technological advancement continues to increase consumer expectations at least with respect to the features that are provided with wireless apparatuses. In order to meet these expectations, manufacturers continue to try to incorporate new features into these devices. It is no longer acceptable to simply provide a means for verbal communication. Instead, apparatuses must now be able to provide various communication, productivity and entertainment services to users. These services must operate in a manner that provides a minimum level of quality or else the desire to utilize these services with diminish along with, in some instances, the desire to own the particular apparatus. Thus, the availability of services has an accompanying requirement of providing these services in accordance with a quality of service (QoS) that is acceptable to users.

However, the previously described objective of offering increased functionality in wireless-enabled apparatuses goes contrary to the concurrent hardware-related goals of reducing the dimensional footprint and energy consumption of these apparatuses. In particular, the users of these apparatuses desire a larger array of features in a smaller apparatus that is operable for longer durations of time before needing to be recharged. While these goals are not mutually exclusive, it would be much easier to provide additional functionality in devices that contain more hardware and/or software resources to support the new services. Of course, incorporating additional hardware and/or software resources would naturally tend to increase the overall size and power requirements of these apparatuses. Thus, achieving the additional goals shrinking the overall size of the apparatus while at the same time making the apparatus more energy efficient may continue to create substantial challenges for wireless apparatus implementation.

SUMMARY

Various example embodiments of the present invention may be directed to a method, apparatus, computer program product and system for making resources in an apparatus available to an entity outside of the apparatus. In at least one example operational scenario, an apparatus may wirelessly interact with other apparatuses via various communication protocols. These apparatuses may be part of an architecture that allows resources to be shared within the architecture. An "entity" may further exist in the architecture that controls how resources are borrowed from, or how resources are provided to, the individual participating apparatuses.

Cloud computing is an example architecture comprising a control entity such as described above. The cloud may be made up of different types of devices that share processing and other hardware/software resources amongst the participating apparatuses. Apparatuses that participate in cloud computing may, in some instances, comprise resources that may be flexibly configured to implement various functionalities. These resources often operate at a level that is below maximum capacity. In accordance with at least one embodiment of the present invention, the unused capacity of these resources may be provided to aid other participants in the cloud.

In one example implementation, apparatuses in the cloud may comprise software defined radio (SDR) modules. SDR modules combine hardware and/or software components that may be reconfigured to support various forms of communication. Depending upon the type of communication, the level of message activity, etc., occurring in an SDR module, some or all of the processing capacity of these modules may go unused over a period of time. This idle time may be determinable based on, for example, scheduling that controls overall communications for the apparatus. In instances where unused processing capacity can be predicted beforehand, this capacity may be reallocated for use by other apparatuses that are participating in the cloud.

Embodiments of the present invention that employ reconfigurable resources may facilitate access to these resources in various ways. For example, control elements related to the resource sharing architecture may emulate radios loaded in SDR modules. The control elements may utilize radios loaded into an SDR module to grant access (e.g., via wireless communication) to apparatus resources that are to be shared. In another configuration, radios may incorporate the control elements that grant access to apparatus resources via dedicated communication protocols.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which.

DESCRIPTION OF EXAMPLE EMBODIMENTS

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Figure 1A:
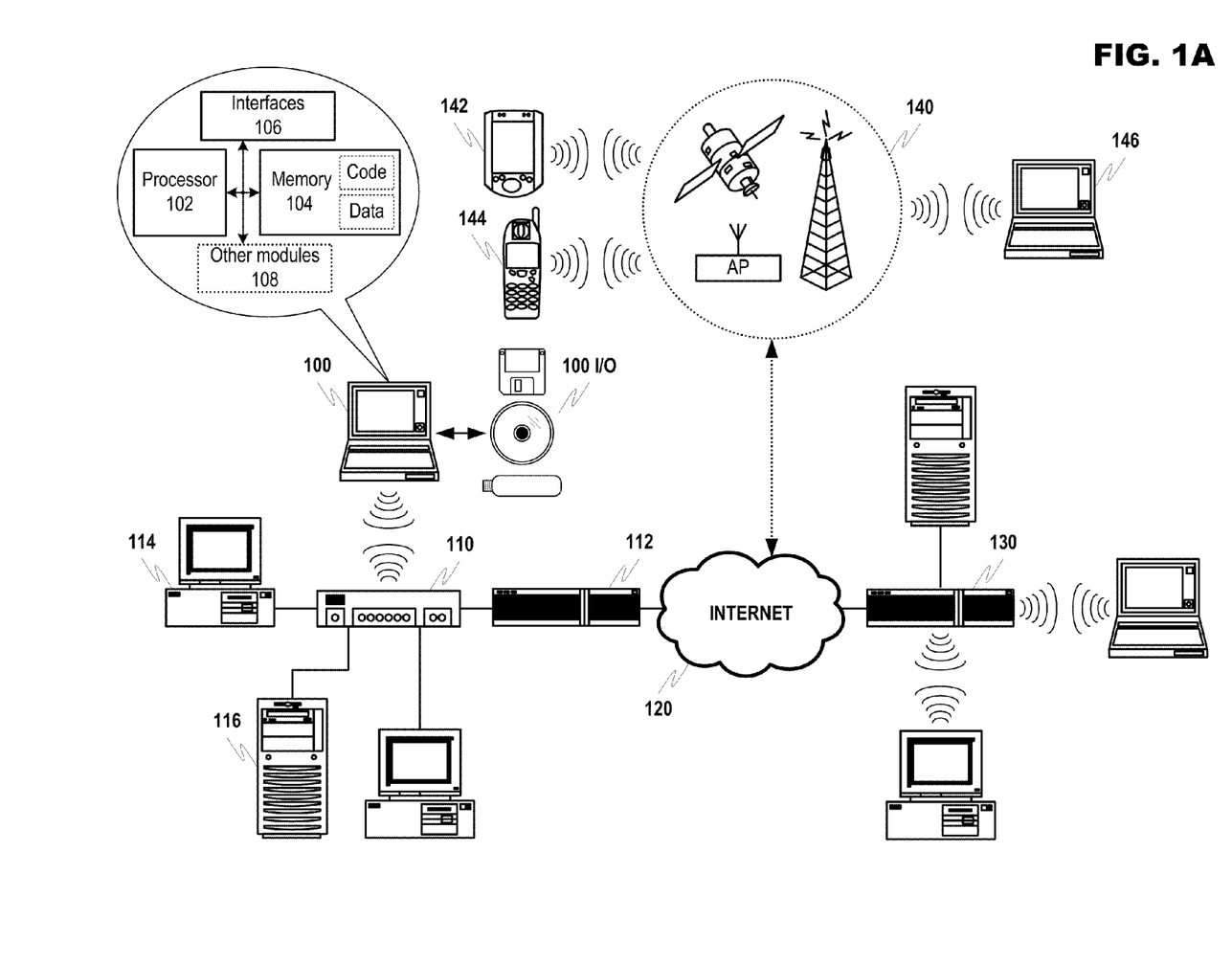
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

Figure 1B:
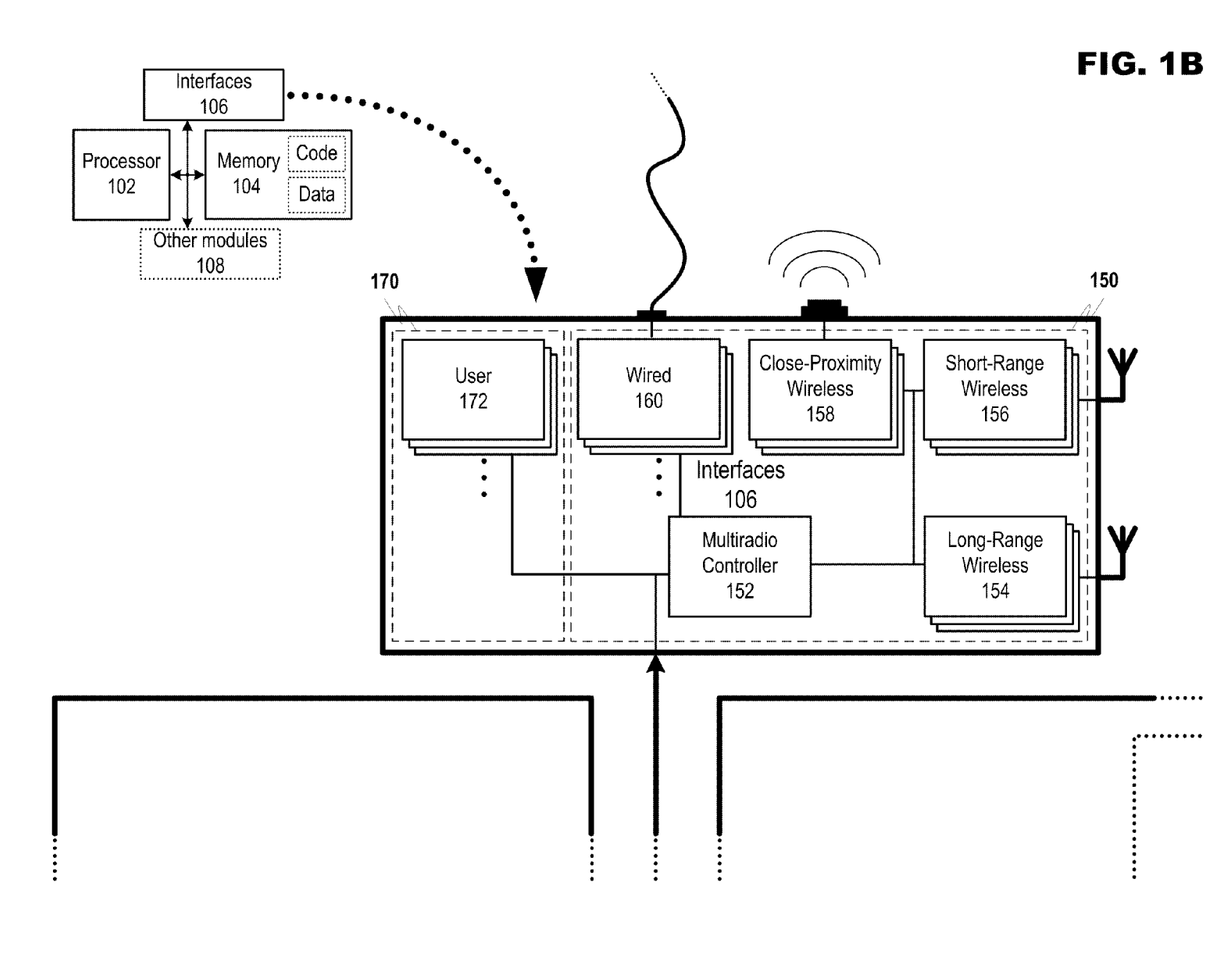

Further detail regarding example interface component 106, shown with respect to computing device 100 in FIG. 1A, is now discussed with respect to FIG. 1B. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Software Defined Radio (SDR) Module

The example of FIG. 1B represents various interfaces as discrete elements within an apparatus. However, instances exist where such discrete elements, such as hardware-based radio modules, may not be appropriate, easy to implement, etc. For example, mobile apparatuses may have space or power limitations that discourage the use of individual hardware-based radio modules. Moreover, hardware based solutions may be considered inflexible with respect to the ability to correct operational issues or expand communication functionality. To alleviate these restrictions, solutions that introduce more variable components are starting to emerge. Some of these solutions may create flexibility through the implementation of software-based elements.

"Radio computers," which fall within the broader software-defined radio (SDR) concept, include platform architectures in which the different radio systems (e.g., "radios") are loaded as software (e.g., "radio software") and in which as single HW/SW platform can be used to implement different wireless connectivity features on shared processing resources. Radio software may define operation and protocols corresponding to cellular communication, local connectivity, broadcast, navigation, etc., and they can be integrated into legacy (existing) radio systems or form totally new radios. Further, "cognitive" radios may include the ability to sense the surrounding environment and to share this information with peers. The sensed information may be utilized, for example, in distributed sensing strategies that allow apparatuses to make localized decisions in view of the entire environment when configuring communication.

Figure 2A:
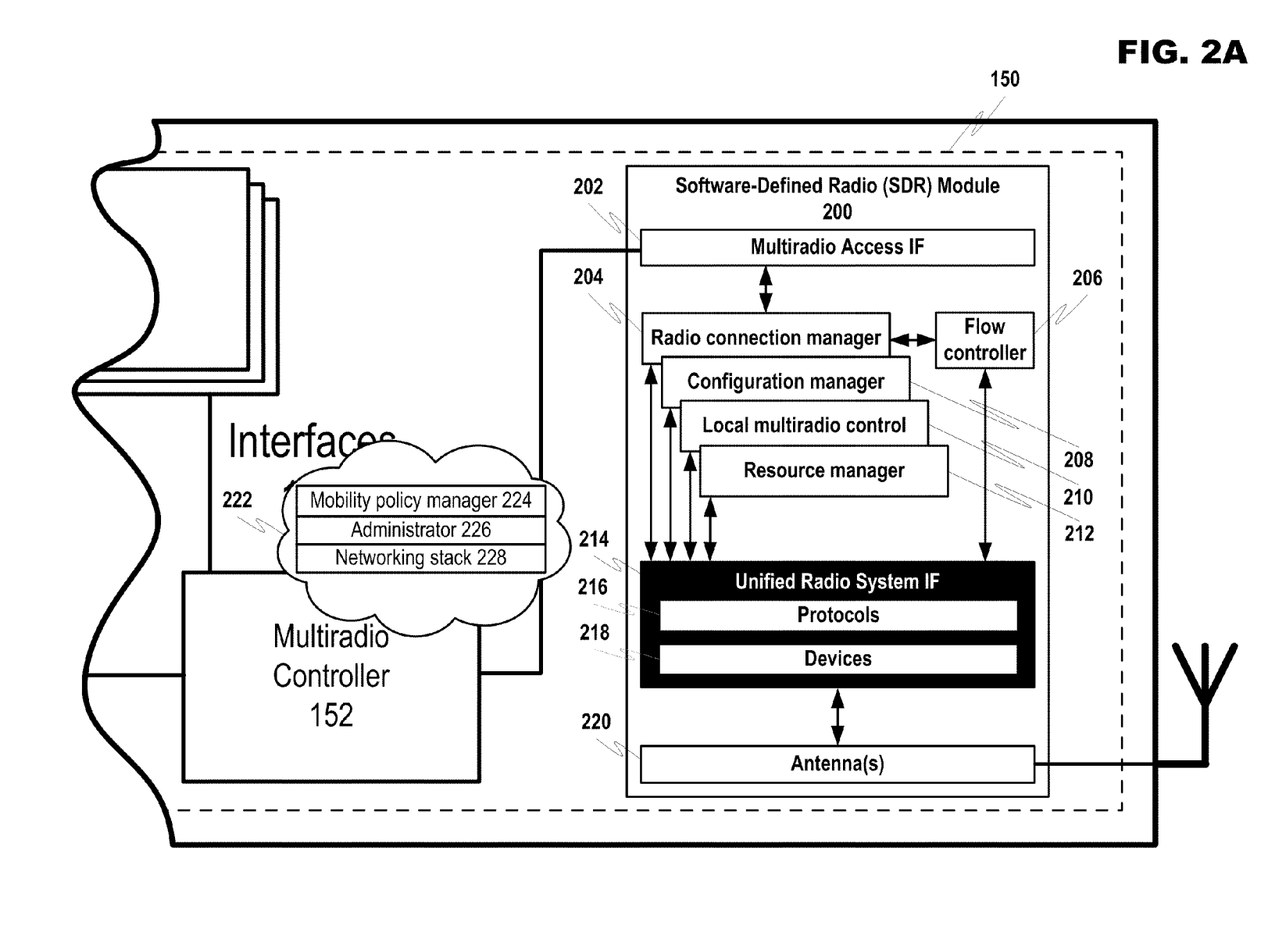
FIG. 2A discloses an example of a software-defined radio (SDR) module that may be utilized when implementing the various embodiments of the present invention.

An example implementation of a software-defined radio (SDR) module usable in accordance with various embodiments of the present invention is disclosed in FIG. 2A. Initially, a partial representation of apparatus level interfaces 150 within interfaces 106 (as previously described in regard to the example operational environment of FIG. 1A) is shown. While SDR module 200 is being implemented in FIG. 2A, interfaces 106 may still employ one or more discrete hardware-based communication modules for supporting interfaces including any of long-range wireless interfaces 154, short-range wireless interfaces 156, close-proximity wireless interfaces 158 and wired interfaces 160. Combined hardware and software-based technologies may be employed, for example, in situations where specialized hardware is required to support particular communication transports, it is more economical to implement a hardware-based solution for a particular communication transport, an SDR module 200 and a hardware-based module are used to support transports that often operate concurrently (e.g., transports that do not interfere with each other, and therefore, can operate at the same time), etc. Overall, the configuration of systems usable with various embodiments of the present invention are not limited to the specific implementation shown, and thus, various example embodiments may incorporate combinations of software-based and hardware-based communication technologies.

FIG. 2A discloses an example implementation where SDR 200 may interact with multiradio controller 152 and other aspects of computing device 100 via various communication paths (e.g., wired or wireless buses) for conveying data within the apparatus. For example, SDR 200 may include multiradio access interface 202 configured for the transmission and reception of delay-sensitive information within computing device 100. In addition, flow controller 206 may interact with programs (e.g., operating system components, utilities, high level applications, etc.) generally operating in computing device 100 in order to regulate the flow of messages being sent from, and being received into, SDR 200. These communication interactions within computing device 100 may cause multiradio access interface 202 and/or flow controller 206 to interact with various software components in SDR 200 in order to emulate hardware-based radio modules.

For example, information received via multiradio access interface 202 and/or flow controller 206 may be used to determine how SDR 200 is to be configured. This configuration may include radio connection manager 204 receiving data from multiradio access interface 202 and/or flow controller 206. This data may include at least one of instruction information (e.g., rules or preferences regarding which transports to utilize in certain situations) and messages awaiting transmission. Radio connection manager 204 may then interact with some or all of configuration manager 208, local multiradio control 210 and resource manager 212 when configuring SDR 200. For instance, configuration manager 208 may provide information regarding resources required for supporting a particular wireless transport, and resource manager 212 may determine if these resources are available. If radio connection manager 204 decides that it is possible to configure SDR 200 to support the particular wireless transport (e.g., in view of the information provided by the other modules) then local multiradio control 210 may implement the configuration. While an example of a usable configuration for SDR 200 has been disclosed in FIG. 2A, other configurations are possible in accordance with various embodiments of the present invention. For example, the functionality of multiradio controller 152 and local multiradio controller 210 may be implemented as a single functional element in interfaces 106.

In implementing a particular radio configuration, some or all of software modules 202-212 may interact with unified radio system interface 214 in order to establish settings that will allow SDR 200 to emulate a desired radio functionality. For example, unified radio systems may include both protocol information 216 and device information 218 usable when replicating the functionality of hardware-based radios. The configured software resources may then utilize hardware resources (e.g., antennas 220) when sending and/or receiving wireless messages. For example, information in protocols 216 and devices 218 may be accessed and/or manipulated in order to emulate the functionality of a radio module that is configured to operate using one or more wireless transports (e.g., Bluetooth, WUSB, etc.) and at the conclusion of activity may be reconfigured to support pending communications via another wireless transport (e.g., WLAN).

In accordance with various embodiments of the present invention, SDR module 200 may interact with various program modules 222 residing in multiradio controller 152 or elsewhere within the control system of computing device 100. Program modules 222 may provide apparatus-side coordination of communication when, for example, multiple SDR modules 200 are active, or when SDR module 200 is active at the same time as a hardware-based radio module. Example program modules 222 may include, but are not limited to, mobility policy manager 224, networking stack 228 and administrator 226. In at least one scenario, mobility policy manager 224 may define preferences and/or rules that control utilization of communication transports in the apparatus.

These preferences and/or rules may be based on various apparatus, application or user-defined characteristics. For example, the number of messages pending for each transport in networking stack 228 may determine the next transport that will be implemented (e.g., a priority between the active transports), and therefore, the next configuration for SDR module 200. In making this determination, mobility policy manager 224 may work with administrator 226 to facilitate configuration changes for SDR module 200. Such configuration changes may at least include loading and/or unloading radios in SDR module 200, as well as installing and/or uninstalling radios in the apparatus, which will be described further in regard to FIG. 2B. Some implementations may also involve administrator 226 in communication control through participation in operational schedule creation so that apparatus communication may continue within the guidelines set forth in the aforementioned preferences and/or rules.

Figure 2B:
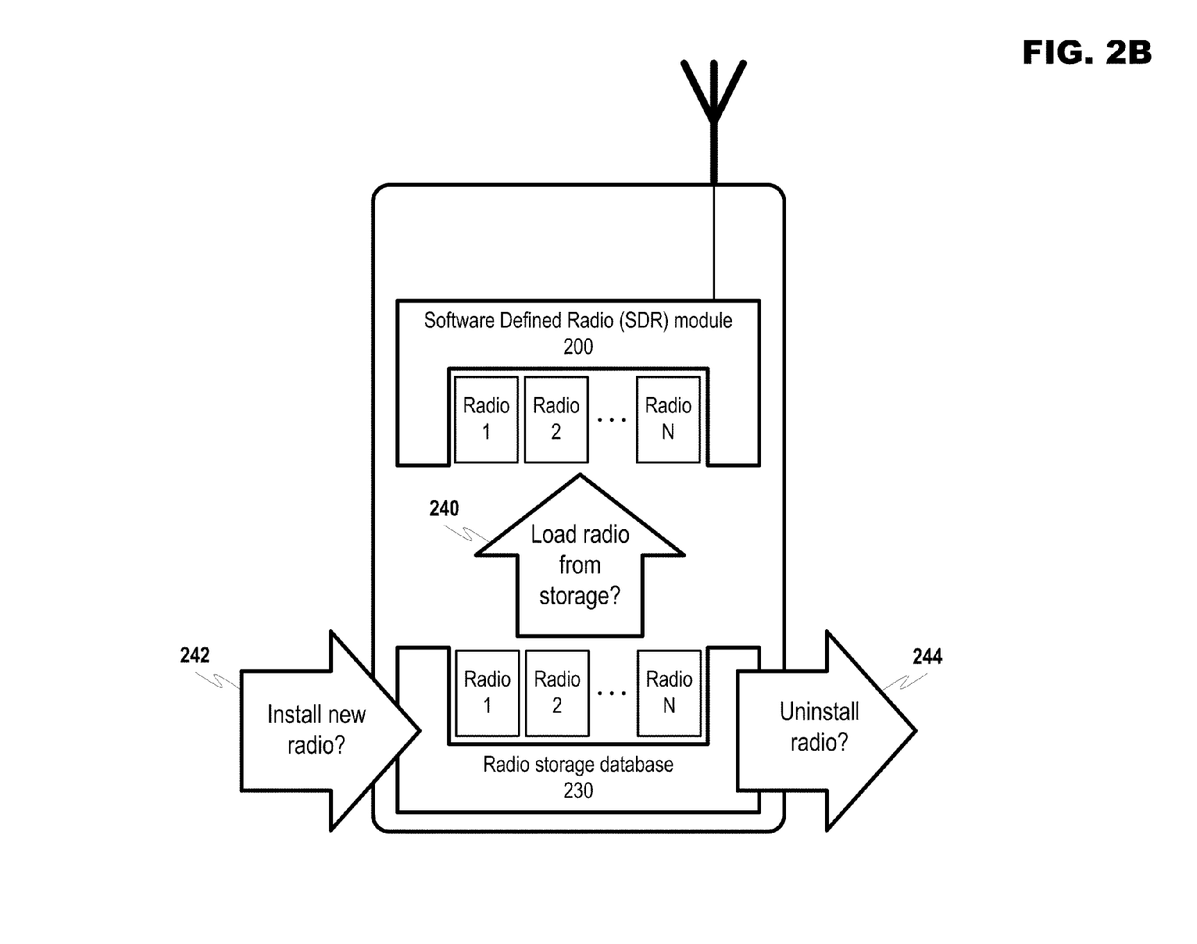
FIG. 2B discloses an example operational scenario in accordance with at least one embodiment of the present invention.

FIG. 2B presents a general operational scenario that will be utilized herein when explaining the various embodiments of the present invention. However, the present invention is not strictly limited to the situation set forth in FIG. 2B, and may therefore also be implemented in other applicable communication managements situations. The apparatus presented in FIG. 2B comprises at least one SDR module 200. In support of module 200, radio storage database 230 may also be present in order to store radio software. Radio software may include configuration information (e.g., radios) that would be needed when configuring SDR module 200 to emulate hardware-based radio operation such as protocols 216 and devices 218 as shown in FIG. 2A.

Example apparatus-related activities are also described in FIG. 2B: installing new radios into the apparatus as shown at 242, loading radios from radio storage database 230 into SDR module 200 as shown at 240, and uninstalling radios from the apparatus as shown at 244. New radio installation activities 242 may be triggered by the realization that radio software associated with desired radio operation that is supported by the apparatus is not resident in radio storage database 230. Installing new radios as shown at 242 may entail, for example, wired or wireless communication with a configuration provider that can transmit the required radio software to the apparatus. Some or all of the radio software may then be stored in radio storage database 230. In some instances, one or more radios defined within the installed radio software may be desired to support pending communication operations in the apparatus. The one or more desired radios may then be loaded into SDR module 200 as shown at 240. The loading activity 240 may involve accessing radio definition information in the radio storage database and using the radio definition information to configure the operation of SDR module 200. In accordance with at least one embodiment of the present invention, SDR module 200 may support multiple concurrent radio configurations. The ability to load more than one radio into SDR module 200 may allow for quick changeovers from one type of communication to another, or in some cases, the ability to carry out communication activities using a plurality of communication transports at substantially the same time (e.g., under control of multiradio controller 152 and/or local multiradio control 210). Radio uninstallation activities 244 may be triggered when, for example, no current or anticipated usage exists for one or more radios. Uninstalling radios with no actual or planned usage from radio storage database 230 not only creates an available storage space for installing new radios at 242, but may also result in other benefits such as powering down unused memory areas, processor cores, signal interfaces, etc. in apparatuses, which may help to conserve vital resources in situations where these resources are constrained (e.g., mobile communicators).

III. Example Resource Sharing Architecture

Figure 3:
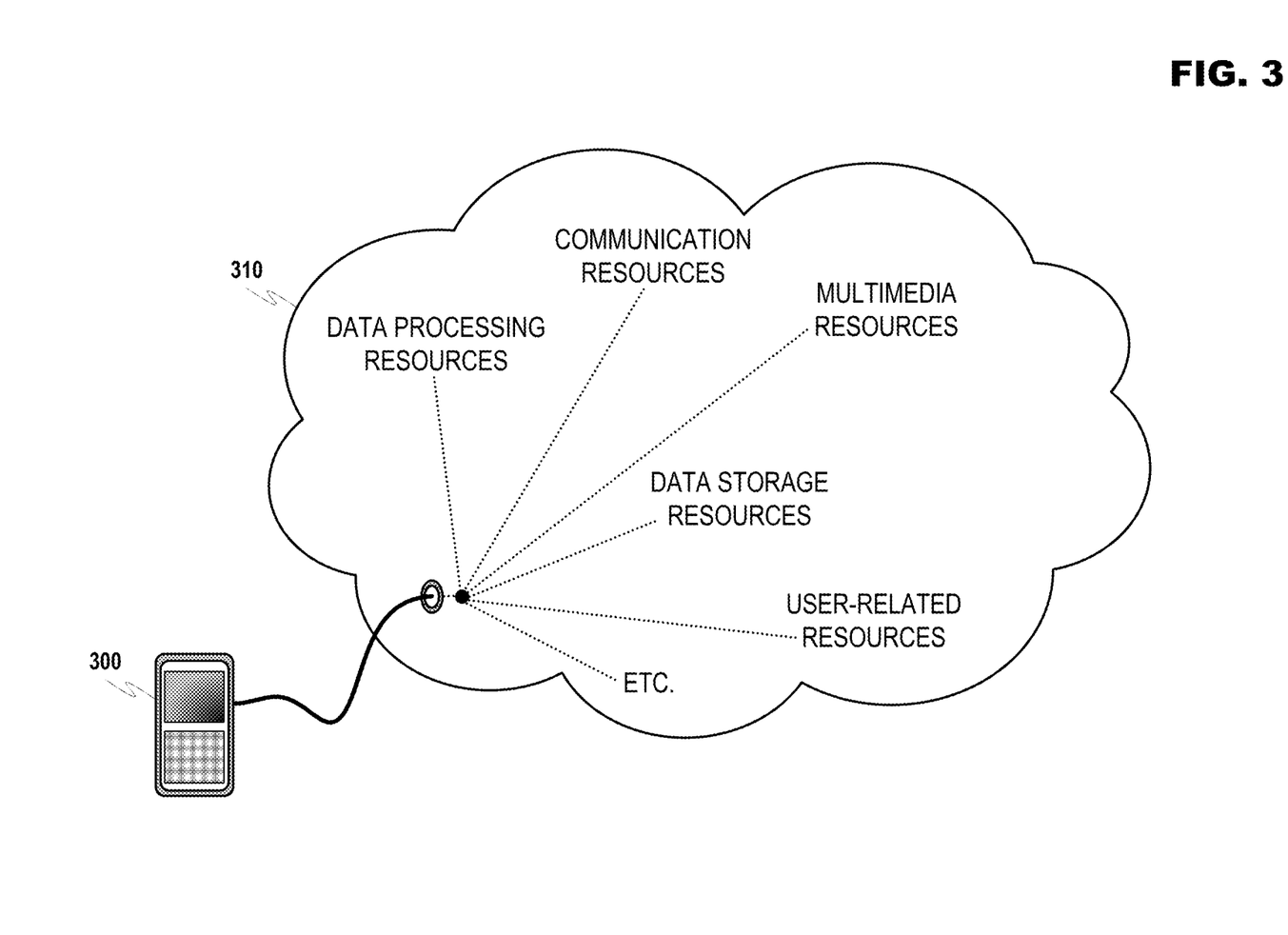
FIG. 3 discloses an example of an operational architecture usable in accordance with various embodiments of the present invention.

Now referring to FIG. 3, an example resource sharing architecture is disclosed. In this example apparatus 300 is metaphorically shown as being "plugged in" to the resources of cloud 310. While apparatus 300 is a wireless communication device (e.g., a cellular handset, a smart phone, a mobile communicator, a programmable digital assistant including communication functionality, etc.), this depiction of apparatus 300 is merely for the sake of explanation herein, and thus, is not intended to limit embodiments of the present invention to this category of device.

The representation disclosed in FIG. 3 is meant to convey that apparatus 300 may be in communication with cloud 310, and that in turn, cloud 310 may facilitate access to various resources that exist outside of apparatus 310. Example resources that may be provided by cloud 310 include, but are not limited to, external data processing resources, communication resources, multimedia resources, data storage resources, user-related resources (such as user interfaces), etc. While the actual source for resources made available by cloud 310 may be other apparatuses that are participating in cloud 310, such as in the example configuration that will be described with respect to FIG. 4, the actual sources may be transparent to apparatus 300. Apparatus 300 may simply interact with the architectural control elements that form cloud 310 in order to access a resource without actually knowing where the resource resides or how the resource is provided.

The provision of functionality outside of the capabilities of a solitary apparatus is but one advantage that may be realized through communication architectures such as disclosed in FIG. 3. An apparatus offering a reduced set of functionality due to size, power and/or processing limitations may not, in itself, be attractive to a user. However, the abilities of this apparatus may be multiplied through the use of a shared-resource architecture. Given that the apparatus has the basic communication and processing abilities required to interact with cloud 310, the apparatus may now use the resources made available through cloud 310 to offer functionality that it would not otherwise be able to offer on its own, which makes the device more useful to consumers.

Figure 4:
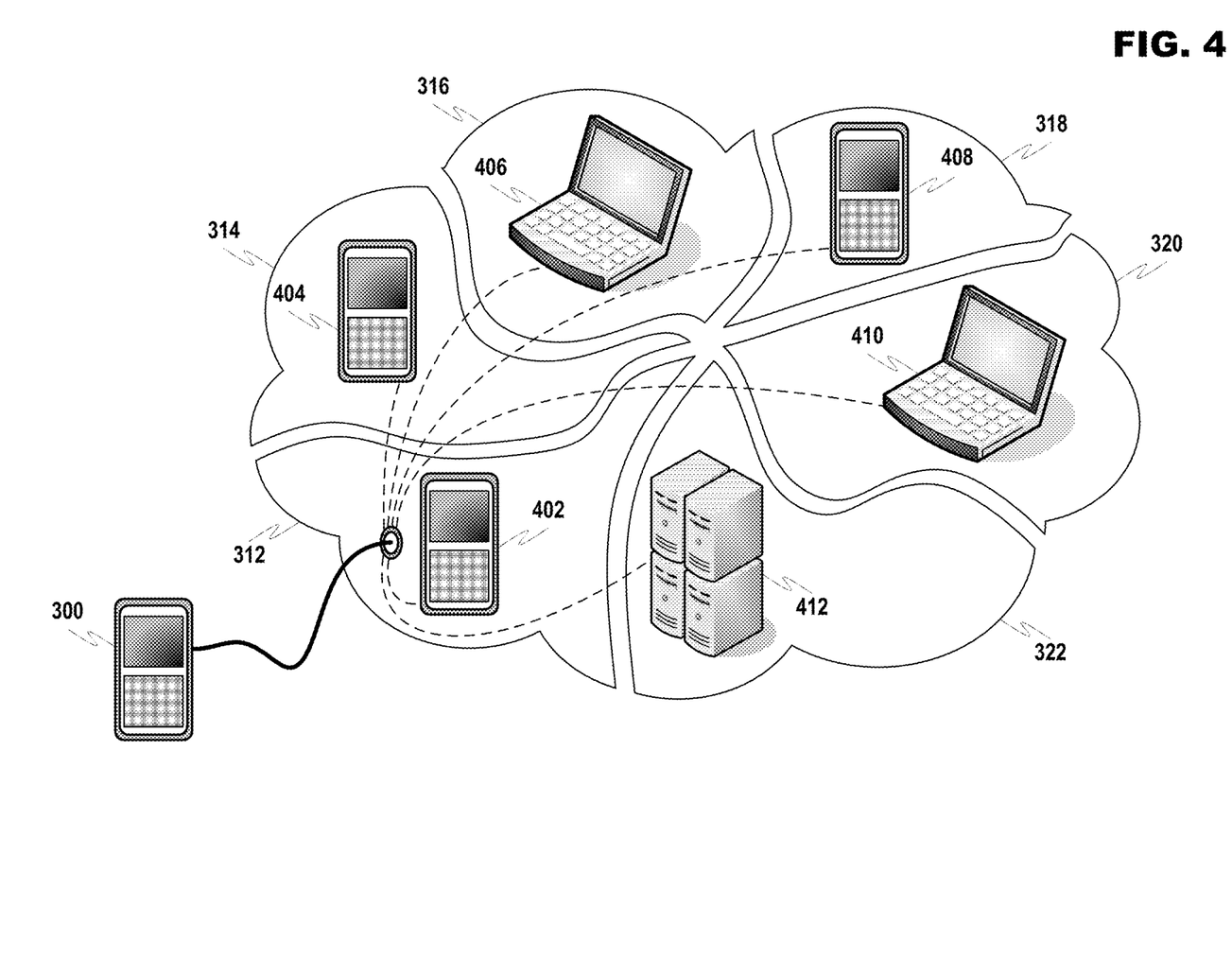
FIG. 4 discloses an example apparatus composition of the operational architecture of FIG. 3 in accordance with at least one embodiment of the present invention.

Shared-resource architectures, by definition, facilitate the sharing of available resources between participating apparatuses. Now referring to FIG. 4, an example configuration of a shared-resource architecture is shown. It becomes apparent that cloud 310 may be organized from the various apparatuses that are making their resources available for sharing. For example, section 312 of the cloud may comprise the resources that have been made available for sharing in apparatus 402 that, in this instance, is a wireless communication apparatus. Likewise, section 314 may comprise the resources offered by wireless communication apparatus 404, section 316 may comprise the resources offered by computing apparatus 406, section 318 may comprise the resources offered by wireless communication apparatus 408, section 320 may comprise the resources offered by computing apparatus 410 and section 322 may comprise the resources offered by electronic storage apparatuses 412 (e.g., one or more data servers). While all of these apparatuses may share resources with apparatus 300 as shown in FIG. 4, the present invention is not limited specifically to the depicted configuration. The various embodiments of the present invention may employ fewer or more participating apparatuses taken from different apparatus types or categories than the apparatuses shown comprising cloud 310 (e.g., sections 312-314).

Of course, inter-apparatus communication must be established in order for the various apparatuses shown in FIG. 4 to form cloud 310. An example of such communication is disclosed in FIG. 5. Apparatuses 300 and 404 to 412 may be enabled to communicate via wired and/or wireless communication protocols. While FIG. 5 discloses one wired or wireless link for each apparatus, the various embodiments of the present invention incorporate scenarios where some or all of the apparatuses are linked to each other via one or more means of communication.

Figure 5:
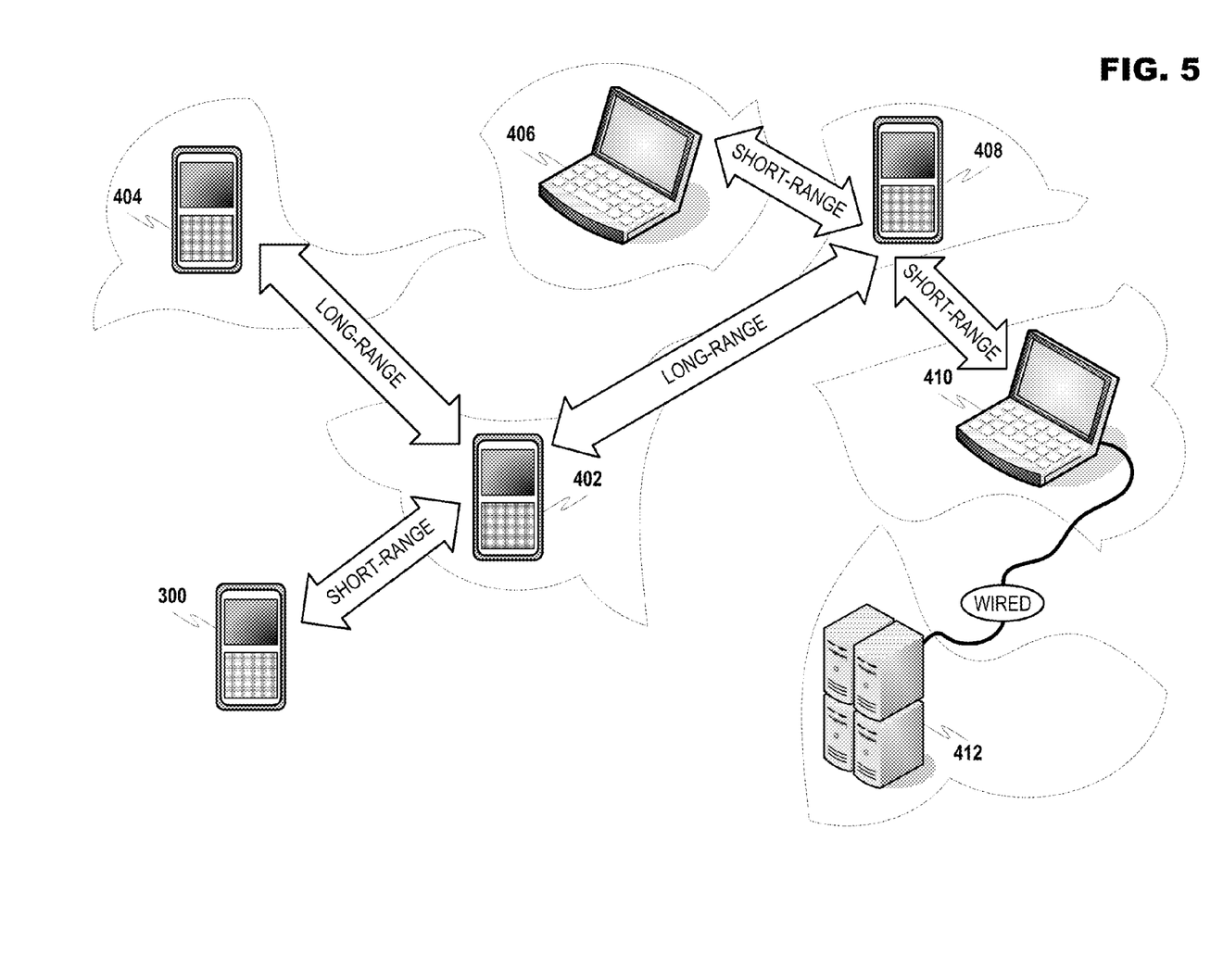
FIG. 5 discloses an example communication configuration of the operational architecture of FIG. 4 in accordance with at least one embodiment of the present invention.

In FIG. 5 apparatus 300 is linked to wireless communication apparatus 402 via short-range wireless communication. Example of wireless protocols that may fall within this category include, but are not limited to, Bluetooth® (BT), Bluetooth low energy® (BTLE), wireless local area networking (WLAN) and wireless universal serial bus (wUSB). Short-range wireless communication may also be employed in forming wireless links from computing devices 406 and 410 to wireless communication apparatus 408. Wireless communication apparatuses, such as apparatuses 402, 404 and 408, may also be linked via long-range communication. Examples of long-range communication may include, but are not limited to, cellular systems like the global system for mobile communications (GSM) and code division multiple access (CDMA) systems. The apparatuses comprised within cloud 310 may also be coupled by wired communication, such as in the instance of computing apparatus 410 and servers 412. An example of a well-known and widely employed wired electronic communication interface is Ethernet communication.

Apparatuses 399 and 402 to 412 in FIG. 5 may interact with each other through the aforementioned communication links. For example, apparatus 300 may interact with computing apparatus 408 by sending information first through the short-range wireless connection to apparatus 402, then through the long-range wireless connection to apparatus 408 and then through the short-range wireless connection to computing apparatus 408. Alternatively, apparatus 300 may create a link directly to computing apparatus 408 (not shown) using one or more of the communication mediums described above. Regardless of the type of link used, the apparatuses of FIG. 5 may utilize these connections when sharing their resources via cloud 310.

IV. Example Facilitation of Resource-sharing Via Software Defined Radio

While FIG. 3-5 disclose example functionality, composition and communication configuration that may a characterize resource-sharing architecture, the examples do not explain the manner in which apparatus resources are identified and made available to other participating apparatuses. More specifically, mechanisms must be in place to evaluate the resources for each apparatus that is participating in the resource sharing architecture, determine apparatus resources, if any, that will be available, when and for what duration, communicate resource availability to the resource-sharing entity and then facilitate access to these resource during the period of time that the resources will remain unused in the apparatus. All of these tasks must further operate given that any apparatus-based need for the resource should have priority over other uses.

In accordance with at least one example embodiment of the present invention, it may be possible to facilitate resource sharing at the system level using reconfigurable resources. These resources would then not only be tasked with their intended primary use, but their flexible nature could also be applied to cloud-computing type functionality. For example, the previously described software defined radio (SDR) module may not only serve the purpose of supporting a plurality of communication protocols, but may also facilitate both the identification of available resources and the sharing of these resources in a resource-sharing environment. When sharing resources between multiple apparatuses in an resource-sharing architecture, SDR modules 200 may contain control entities that correspond to resource allocation and admission control in addition to scheduling. These entities, in addition to allowing for multiradio execution, may also support non-radio applications like cloud computing services to be run simultaneously with radios, utilizing computing power not needed for radios without disturbing their operation.

For example, an apparatus may comprise one or more SDR modules capable of loading multiple radios, such as disclosed at 200 in FIG. 2B. At least one of the SDR modules may also comprise a resource-sharing application element that may be linked to other resource-sharing application elements existing outside of the apparatus utilizing either an existing wired and/or wireless communication protocol (e.g., another radio loaded in the SDR module) or a via a radio protocol that is dedicated for use in shared-resource operations (e.g., a communication transport dedicated to cloud computing). Given such a configuration, resource sharing may be realized by connecting the elements to form a cloud and defining an access interface to the cloud. Moreover, the sharing entity (e.g., cloud computing network) may be established efficiently and safely without disturbing simultaneously active radios that are also loaded into an SDR module.

Control components that may be active when implementing various embodiments of the present invention include resource manager (RM) 212, which manages admission control for common resources, and multiradio controller (MRC) 152, which performs dynamic, run-time communication control when multiple substantially-concurrent communication activities are occurring in an apparatus. In accordance with at least one example implementation, RM 212 may perform an admission check for resources when a new radio is started or when active radios make substantial changes in their resource usage profiles (e.g. when communication activities terminate, radios may change to a sleep state to indicate a reduced need for baseband computing resources). Based on these admission checks, RM 212 may determine the need for resources and allocate these required resources to radios loaded in SDR module 200.

SDR module operation may also allow for resource sharing between active radios on a time-division basis. In the instance that resources in an apparatus are being shared between two or more active radios, MRC 152 may detect or predict (e.g., based on operational schedules formulated for the two or more active radios) the potential for simultaneous attempts to access the shared resources. MRC 152 may then dynamically control access to the shared resources in order to ensure that higher priority radios can operate unimpeded over lower priority radio(s). In this manner, MRC 152 helps to support robust execution of multiple concurrent communications that relies upon shared computing resources without radios knowing anything about each others, and guaranteeing that secondary radios do not disturb higher priority radios. In case of conflict, secondary radios may possibly see performance degradation because the higher priority primary radio is favored by MRC 152, but overall communication will still continue in the apparatus.

Besides radios, the SDR module framework may provide a controlled execution environment also for other, non-radio applications that are executing on the module platform. In accordance with at least one embodiment of the present invention, the SDR module may be used to execute a shared-resource element (e.g., cloud computing service application) simultaneously with radios, as disclosed in FIG. 4. Cloud computing server 608 may be managed like a low-priority secondary radio which gets computing time not used by primary radios.

For example, time-divided cellular radio may use 12.5% of baseband processing capacity (e.g., vector processor time) in an SDR module in certain operating modes. Vector processing may then be scheduled in a round-robin order for certain semi-static task sets, where individual tasks are, for example, baseband processing subtasks extracted from the synchronous data flow (SDF) graph model. A radio may request required resources for baseband computation from RM 212. RM 212 determines the suitable resources (e.g., vector processor time), and allocate them to the radio. Because the resources are not being shared (there is only one radio requesting vector processing), there is no need for MRC 152 to set any operational schedules, and thus, the resource admission/allocation stage is done. The radio may then operate, leaving. cloud computing server able to access about 80% of vector processor time for cloud computing.

RM 212 may then allow the vector processor to perform both calculations (e.g., supporting both the radio and cloud computing). However, because there is no guarantee that radio time slots will not overlap with cloud computing requests, and since they share the same vector processor, RM 212 may request that MRC 152 enforce an additional scheduling rule to ensure that the radio is not negatively impacted by the activities of the cloud computing server. This rule may implicate that during scheduling MRC 152 must consider the radio and the resource-sharing element (cloud server 608) as mutually exclusive radios with the radio being considered higher priority than cloud server 608. In the case of temporal conflicts, the radio would then be favored. After a safeguarding rule is established, vector processing bandwidth may be granted to cloud computing server 608. During the operation, MRC 152 may request schedule information from both applications (radio and cloud computing server) and may resolve conflicts either by denying conflicting slots from cloud computing server 608, or by moving conflicting slots to free slots.

Figure 6:
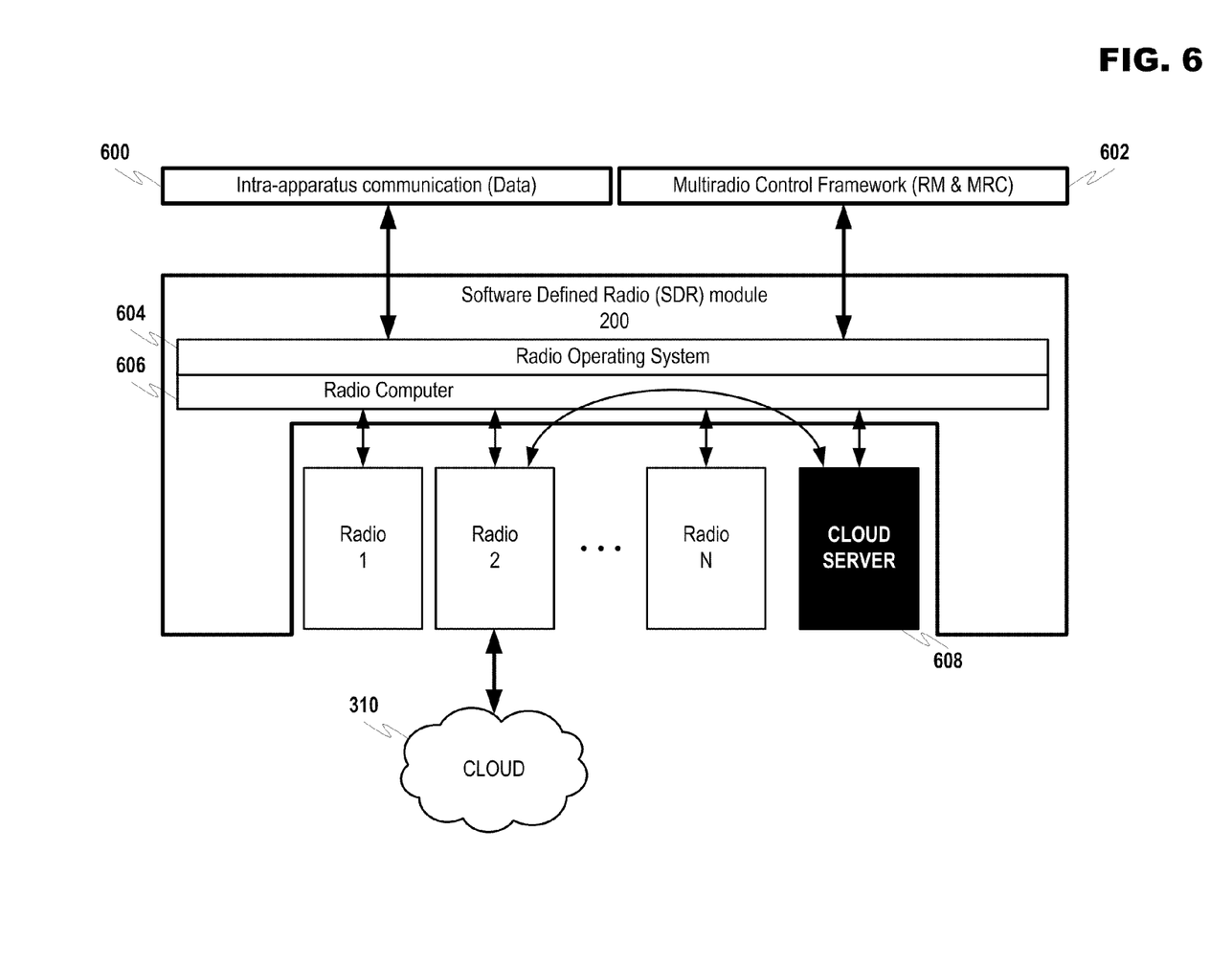
FIG. 6 discloses an example implementation for sharing apparatus resources in accordance with at least one embodiment of the present invention.

Communication between computing cloud nodes (e.g., apparatuses participating in a shared-resource architecture) can be implemented using existing radios that interact with a separate cloud server or by using a combined "cloud radio." An implementation in accordance with at least one embodiment of the present invention that utilizes existing radios and a resource-sharing element as a separate component is disclosed in FIG. 6. An apparatus may comprise one or more SDR modules 200 that interact with other systems in the apparatus as represented by inter-apparatus communication 600. Inter-apparatus communication 600 may represent data exchanges where messages are sent from, and received by, various applications residing in the apparatus. Communication activity resulting from inter-apparatus communication 600 may invoke multiple concurrent active radios in SDR module 200. These radios may be managed by multiradio control framework 602 (including at least RM 212 and MRC 152). Multiradio control framework 602 may further interact with the software aspects (e.g., radio operating system 604) and hardware aspects (e.g., radio computer 606) in order to perform activities such as installing radios, loading radios, unloading radios and uninstalling radios such as shown in FIG. 2B.

In accordance with the example embodiment of the present invention disclosed in FIG. 6, one of the radios executed in SDR module 200 may operate as cloud computing server 608 within the apparatus, which emulates a lower priority radio from the standpoint of SDR module 200 while communicating with cloud 310 (e.g., a sharing control entity external to the apparatus) via any of existing radios 1 . . . N (in this example, radio 2). If SDR module 200 is already executing the maximum number of simultaneous radios possible, then there are no free resources for cloud computing server 308 and it may be disabled (e.g., unloaded or prevented from being loaded) by multiradio control framework 602. However, given an available slot and no conflicts with other apparatus activity, cloud server 608 may execute alongside radios 1 . . . N, and may in turn utilize radio 2 when communicating with cloud computing entity 310.

Figure 7:
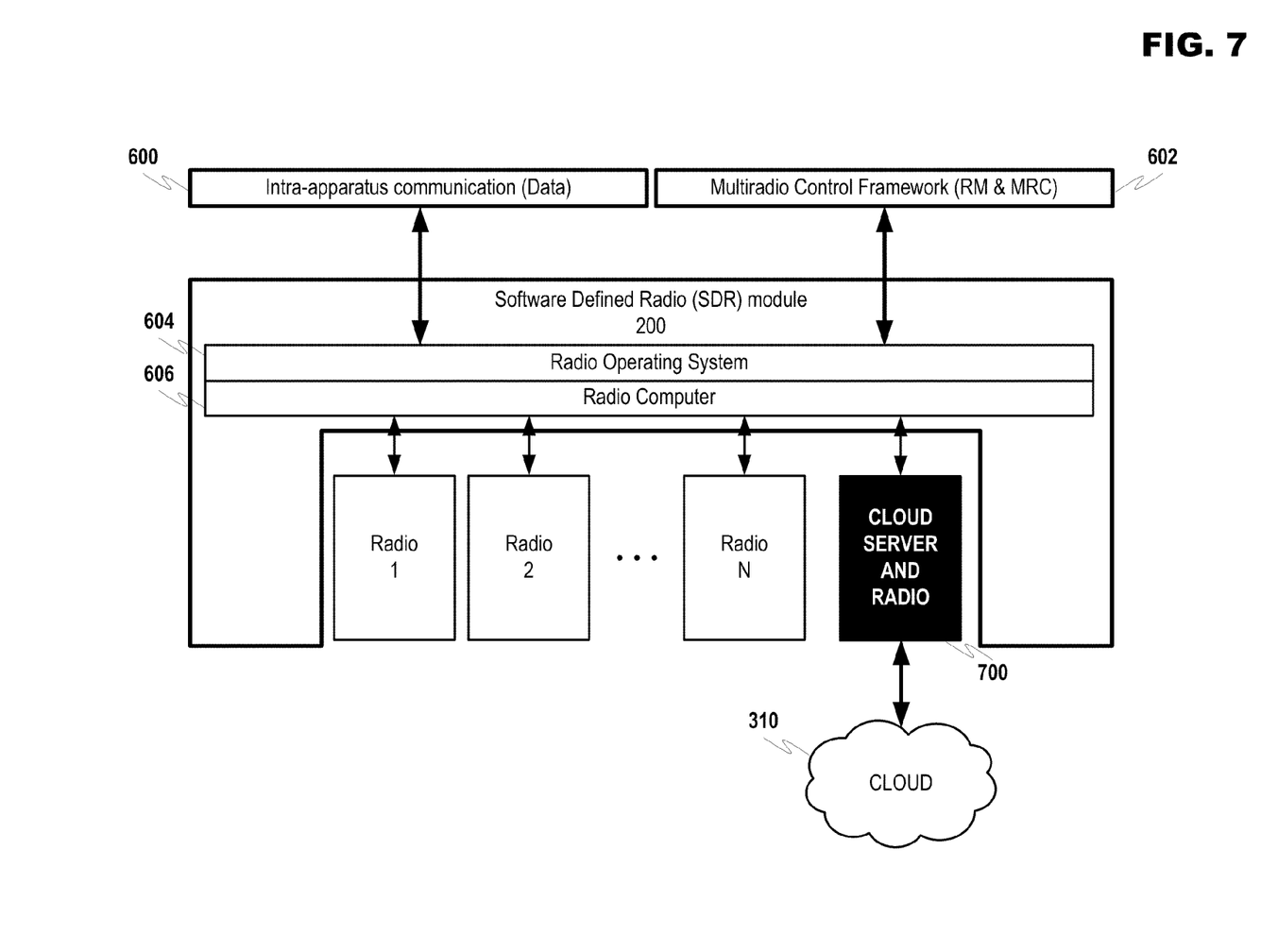
FIG. 7 discloses an alternative example implementation for sharing apparatus resources in accordance with at least one embodiment of the present invention.

In accordance with at least one alternative embodiment of the present invention, another implementation is disclosed in FIG. 7, wherein a radio incorporates a cloud computing server element forming a cloud computing radio 700. Cloud computing radio 700 may, in some instances, utilize a form of communication (e.g., radio protocol) that is dedicated to interacting with other cloud components. As, in this example, both the cloud server and radio are combined into a single entity, cloud computing radio 700 may both interact with a cloud network and also request computing resources from SDR module 200. Moreover, because SDR module 200 can install radios after device is shipped (as described above), it is possible to build custom wireless cloud computing networks utilizing this scenario, even when apparatuses were not specifically intended for such operation as part of the factory configuration process.

SDR module may see cloud computing server 608 as an extra radio application, and thus, may utilize the same control and resource management scheme that it uses for other loaded radios in order to schedule computing time for cloud server 608. Also, both scenarios described in FIGS. 6 and 7 allow a cloud computing network node to be implemented without utilizing a separate application processor in the apparatus. For example, everything may be executed in SDR module 200, allowing an application processor to stay in power save mode. Cloud network nodes (e.g., cloud servers in participating apparatuses) may communicate via wired and/or wireless communication, such as by using a short-range wireless protocol (e.g., BT, WLAN, UWB, etc.) or long-range cellular communication (e.g. GSM, WCMDA, LTE). The size of a cloud is scalable. Using short-range wireless communication, the physical size may be limited by range, starting with few meters up to few hundreds meters. If cellular communication is used, a cloud may be extended to incorporate all apparatuses with SDR-based communication that are connected to a network, providing extreme huge capacity (millions of nodes).

Figure 8:
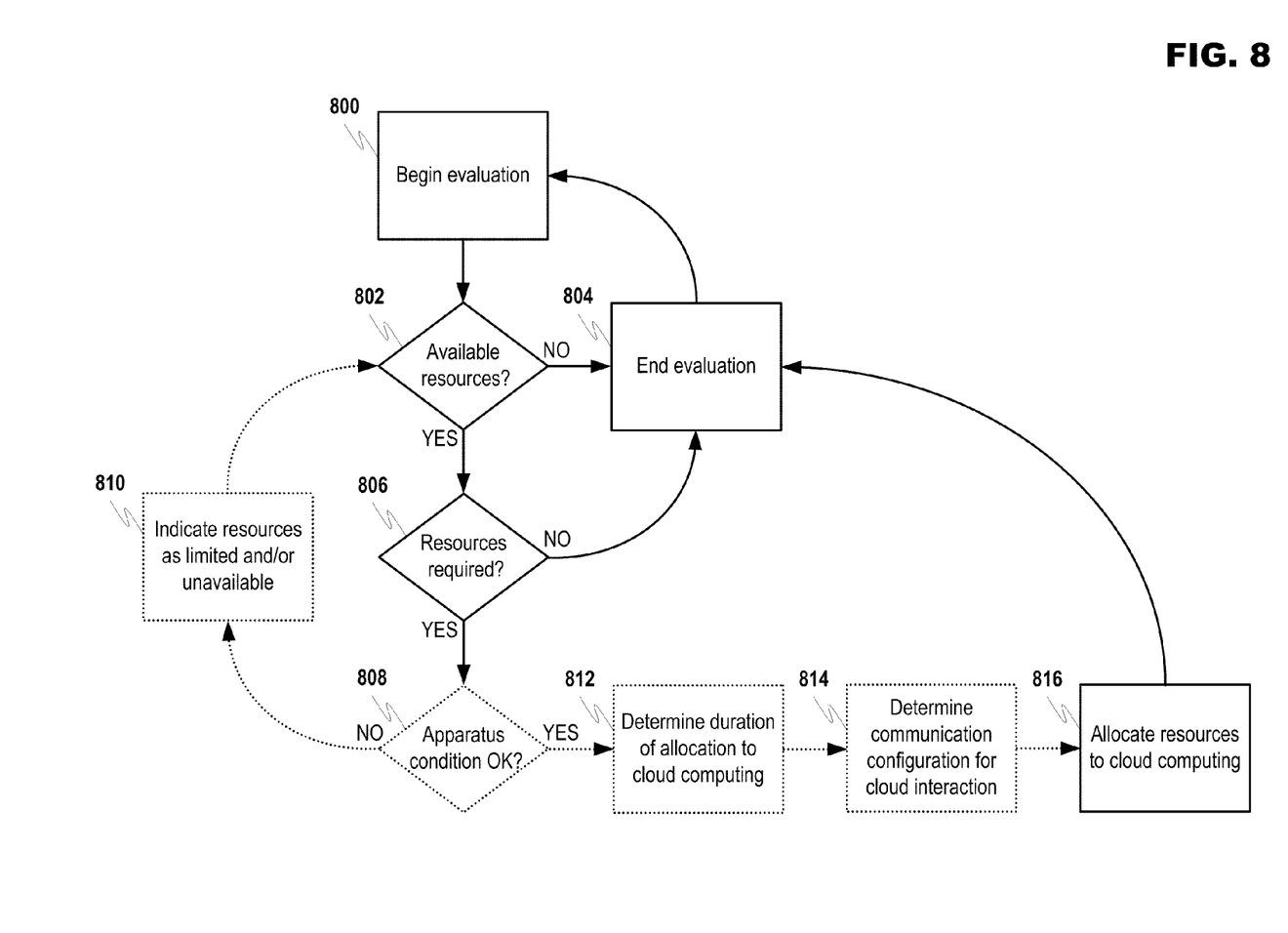
FIG. 8 discloses a flowchart of an example process for facilitating resource sharing in accordance with at least one embodiment of the present invention.

A flowchart of an example process in accordance with at least one embodiment of the present invention is disclosed in FIG. 8. The process may initiate in step 800 by evaluating available resources in an apparatus. In general, an apparatus may be able to predict the resources that are reserved for use over a certain period of time through scheduling established by resource managers within the apparatus. A specific example of such processes may include accessing a schedule established by an MRC to determine periods of time during which no (or low) activity is schedule for SDR modules. These activity periods conversely indicate that there may be some processing bandwidth available in vector processors existing within the SDR modules that may be reallocated for resource-sharing processes such as cloud computing. If in step 802 no resources are determined to be available (e.g., based on no slots being open for loading radios), then the evaluation may terminate in step 804 and return to step 800 for another evaluation cycle.

On the other hand, if the evaluation of step 800 results in at least some resources in the apparatus being deemed available for sharing in step 802, then in step 806 a determination may be made as to whether the available resources are actually required outside of the apparatus. For example, if the apparatus is not actively participating in cloud computing, then the process may terminate in step 804. If, however, a determination is made that the apparatus is actively participating in a resource sharing entity, then the process disclosed in FIG. 8 may continue. In accordance with various example system configurations, steps 808 to 814 have been identified as optional features that may be implemented based on various factors including, for example, the level of complexity of the apparatus, the configuration of the resource-sharing architecture, etc.

In accordance with at least one embodiment of the present invention, a status or condition of the apparatus may be evaluated in step 808 in order to determine whether apparatus resources should be shared within the resource sharing entity. For example, even if resources are deemed available in step 802, and requirements exist for these resources per step 806, the state or condition of the apparatus (e.g., power level) may dictate that some or all of the resources not be shared in order to protect the integrity of the apparatus. Such a determination may result in an indication in step 810 that the availability of some or all of the resources in the apparatus is limited, or even that some or all of the resources are unavailable. The process may then return to step 802 to repeat the evaluation in view of any indications created in step 810. If the condition of the apparatus is deemed acceptable for sharing resources in step 808, the apparatus may then optionally determine a duration of time during which available resources (e.g., vector processors) will be allocated to the cloud computer in step 812. These durations may, for example, be based upon operational schedules (e.g., formulated by an MRC), and may provide additional visibility to the resource sharing entity that may be helpful in selecting the particular computing tasks are most appropriate for the apparatus. For example, if resources will only be available for a short time, the cloud may only allocate short or simple processes to the resources in the apparatus.

Optional step 814 entails determining the communication configuration for cloud interaction, and likewise, may only occur given certain circumstances. For example, an SDR module may be utilized to share resources within a cloud computer. If the SDR is implemented with a separate cloud server (such as in the example of FIG. 6), then the cloud server may utilize existing radios in order to participate in cloud computing. Step 814 may then be incorporated in order to determine the communication configuration (e.g., install, load, etc.) for a particular radio possibly including establishing time in an operational schedule for the particular radio during the period when the resources are going to be allocated to cloud computing. However, step 814 may be unnecessary if the cloud server utilizes a dedicated radio configuration, such as disclosed with respect to the example of FIG. 7, since the communication configuration is more or less set.

Regardless of whether any of the steps 808 to 814 are executed, the process may continue to step 816 where available resources may be allocated to cloud computing. Allocating resources may comprise, for example, allowing a cloud server (or alternatively a cloud radio if the functionalities are combined such as in FIG. 7) to access available resources in an apparatus over a certain period of time. The process may then terminate in step 804 and return to step 800 to await the next evaluation cycle. While not disclosed in FIG. 8, the process may be interrupted in situations where available resources become required in the apparatus and/or other operational conflicts arise. For example, in instances where unexpected conflicts arise, control elements in the apparatus (e.g., an MRC and/or RM) may reallocate timeslots during which resources were to be shared to local radios which may be deemed to be of higher priority than cloud servers/radios in accordance with the embodiments of the present invention as previous described.

The various embodiments of the present invention are not limited only to the examples disclosed above, and may encompass other configurations or implementations.

For example, example embodiments of the present invention may encompass apparatuses comprising means for determining if computing resources associated with wireless communication in an apparatus will not be utilized by the apparatus; means for, if it is determined that the computing resources will not be utilized by the apparatus, determining if computing resource requirements exist for an entity outside of the apparatus, and means for, if it is determined that computing resource requirements exist, making some or all of the computing resources available to the entity outside of the apparatus via wireless communication.

At least one other example embodiment of the present invention may include electronic signals that cause apparatuses to determine if computing resources associated with wireless communication in an apparatus will not be utilized by the apparatus, if it is determined that the resources will not be utilized by the apparatus, determine if computing resource requirements exist for an entity outside of the apparatus, and if it is determined that computing resource requirements exist, make some or all of the computing resources available to the entity outside of the apparatus via wireless communication.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   determining if computing resources associated with a reconfigurable radio module in an apparatus will not be utilized by the apparatus during one or more time intervals;
   if it is determined that the computing resources will not be utilized by the apparatus during the one or more time intervals, determining if computing resource requirements exist for an entity outside of the apparatus; and
   if it is determined that computing resource requirements exist at least during a portion of the one or more time intervals, making some or all of the computing resources available to the entity outside of the apparatus during the portion of the one or more time intervals via a resource-sharing element emulating a radio having a lower priority than radios in the reconfigurable radio module.

2. The method of claim 1, wherein determining if the computing resources will not be utilized comprises determining whether there is any scheduled usage for the computing resources during a certain period of time, and determining if computing resource requirements exist comprises determining whether the entity outside of the apparatus will need additional computing resources during the certain period of time.

3. The method of claim 1, wherein making some or all of the computing resources available comprises allowing the entity outside of the apparatus to wirelessly access some or all of the computing resources via a radio loaded in the reconfigurable radio module existing in the apparatus.

4. The method of claim 3, wherein the radio loaded in the reconfigurable radio module communicates with a control element also loaded in the reconfigurable radio module, the control element corresponding to the entity existing outside of the apparatus.

5. The method of claim 4, wherein the control element emulates a radio that has a lower priority than ether radios that are also loaded in the reconfigurable radio module.

6. The method of claim 3, wherein the radio loaded in the reconfigurable radio module includes a control element corresponding to the entity existing outside of the apparatus.

7. A computer program product comprising computer executable program code recorded on a computer readable non-transitory storage medium, the computer executable program code comprising:
   code configured to determine if computing resources associated with a reconfigurable radio module in an apparatus will not be utilized by the apparatus during one or more time intervals;
   code configured to, if it is determined that the computing resources will not be utilized by the apparatus during the one or more time intervals, determine if computing resource requirements exist for an entity outside of the apparatus; and
   code configured to, if it is determined that computing resource requirements exist at least during a portion of the one or more time intervals, make some or all of the computing resources available to the entity outside of the apparatus during the portion of the one or more time intervals via a resource-sharing element emulating a radio having a lower priority than radios in the reconfigurable radio module.

8. The computer program product of claim 7, wherein determining if the computing resources will not be utilized comprises determining whether there is any scheduled usage for the computing resources during a certain period of time, and determining if resource requirements exist comprises determining whether the entity outside of the apparatus will need additional computing resources during the certain period of time.

9. The computer program product of claim 7, wherein making some or all of the computing resources available comprises allowing the entity outside of the apparatus to wirelessly access some or all of the computing resources via a radio loaded in the reconfigurable radio module existing in the apparatus.

10. The computer program product of claim 9, wherein the radio loaded in the reconfigurable radio module communicates with a control element also loaded in the reconfigurable radio module, the control element corresponding to the entity existing outside of the apparatus.

11. The computer program product of claim 10, wherein the control element emulates a radio that has a lower priority than radios that are also loaded in the reconfigurable radio module.

12. The computer program product of claim 9, wherein the radio loaded in the reconfigurable radio module includes a control element corresponding to the entity existing outside of the apparatus.

13. An apparatus, comprising:
   at least one processor; and
   at least one memory including executable instructions, the at least one memory and the executable instructions being configured to, in cooperation with the at least one processor, cause the apparatus to perform at least the following:
   determine if computing resources associated with a reconfigurable radio module in the apparatus will not be utilized by the apparatus during one or more time intervals;
   if it is determined that the computing resources will not be utilized by the apparatus during the one or more time intervals, determining if computing resource requirements exist for an entity outside of the apparatus; and
   if it is determined that computing resource requirements exist at least during a portion of the one or more time intervals, make some or all of the computing resources available to the entity outside of the apparatus during the portion of the one or more time intervals via a resource-sharing element emulating a radio having a lower priority than radios in the reconfigurable radio module.

14. The apparatus of claim 13, wherein determining if the computing resources will not be utilized comprises determining whether there is any scheduled usage for the computing resources during a certain period of time, and determining if computing resource requirements exist comprises determining whether the entity outside of the apparatus will need additional computing resources during the certain period of time.

15. The apparatus of claim 13, wherein making some or all of the computing resources available comprises allowing the entity outside of the apparatus to wirelessly access some or all of the computing resources via a radio loaded in the reconfigurable radio module existing in the apparatus.

16. The apparatus of claim 15, wherein the radio loaded in the reconfigurable radio module communicates with a control element also loaded in the reconfigurable radio module, the control element corresponding to the entity existing outside of the apparatus.

17. The apparatus of claim 16, wherein the control element emulates a radio that has a lower priority than radios that are also loaded in the reconfigurable radio module.

18. The apparatus of claim 15, wherein the radio loaded in the reconfigurable radio module includes a control element corresponding to the entity existing outside of the apparatus.

19. A system, comprising:
   an apparatus; and
   a cloud resource sharing environment existing outside the apparatus;
   the apparatus determining if computing resources associated with a reconfigurable radio module will not be utilized by the apparatus during one or more time intervals, and if it is determined that the computing resources will not be utilized by the apparatus during the one or more time intervals, determining if computing resource requirements exist for the cloud resource sharing environment; and
   the apparatus further, if it is determined that computing resource requirements exist at least during a portion of the one or more time intervals, making some or all of the computing resources available to the cloud resource sharing environment during the portion of the one or more time intervals via a resource-sharing element emulating a radio having a lower priority than radios in the reconfigurable radio module.

* * * * *